(12) United States Patent
Hannula et al.

(10) Patent No.: US 10,879,969 B2
(45) Date of Patent: Dec. 29, 2020

(54) MIMO ANTENNA ARRANGEMENT

(71) Applicant: Huawei Technologies Co., Ltd., Shenzhen (CN)

(72) Inventors: Jari-Matti Hannula, Kista (SE); Ville Viikari, Kista (SE); Jari Holopainen, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/551,033

(22) Filed: Aug. 26, 2019

(65) Prior Publication Data

US 2019/0379436 A1    Dec. 12, 2019

Related U.S. Application Data

(63) Continuation of application No. PCT/EP2017/054468, filed on Feb. 27, 2017.

(51) Int. Cl.
| | |
|---|---|
| *H04B 7/08* | (2006.01) |
| *H04B 7/0456* | (2017.01) |
| *H01Q 3/26* | (2006.01) |
| *H04B 7/024* | (2017.01) |
| *H04B 7/06* | (2006.01) |

(52) U.S. Cl.
CPC ......... *H04B 7/0456* (2013.01); *H01Q 3/2623* (2013.01); *H04B 7/024* (2013.01); *H04B 7/0665* (2013.01)

(58) Field of Classification Search
CPC .... H04B 7/024; H04B 7/0456; H04B 7/0469; H04B 7/0613; H04B 7/0615; H04B 7/0617; H04B 7/0665; H04B 7/0691; H04B 7/0865; H04B 7/0874; H01Q 3/2623; H01Q 3/26; H01Q 5/42; H01Q 21/29

See application file for complete search history.

(56) References Cited

U.S. PATENT DOCUMENTS

| | | | | |
|---|---|---|---|---|
| 5,852,630 A | * | 12/1998 | Langberg | H04L 27/2647 375/219 |
| 2011/0159825 A1 | * | 6/2011 | Lee | H04B 7/0691 455/91 |
| 2012/0088537 A1 | * | 4/2012 | Petersson | H04B 7/0626 455/522 |

(Continued)

FOREIGN PATENT DOCUMENTS

| | | |
|---|---|---|
| EP | 2521278 A1 | 11/2012 |
| WO | 2011079429 | 7/2011 |

OTHER PUBLICATIONS

Nokia Networks, "Looking ahead to 5G," White Paper, 2015, 16 pages.

(Continued)

*Primary Examiner* — Siu M Lee
(74) *Attorney, Agent, or Firm* — Slater Matsil, LLP

(57) ABSTRACT

A device comprises antennas and a signal processor, and each antenna comprises antenna elements. The signal processor is configured to: receive an input signal for a multiple-input multiple-output (MIMO) operation; generate complex weights; generate feed signals based on the input signal and the complex weights; and provide the feed signals to the antenna elements so that the MIMO operation uses at least two antenna elements from two different antennas.

18 Claims, 12 Drawing Sheets

(56) References Cited

U.S. PATENT DOCUMENTS

| | | | |
|---|---|---|---|
| 2012/0294382 A1 | 11/2012 | Wang et al. | |
| 2014/0192768 A1 | 7/2014 | Yeh et al. | |
| 2014/0211731 A1* | 7/2014 | Inoue | H04B 7/0456 370/329 |
| 2016/0072194 A1* | 3/2016 | Yoshida | H01Q 5/335 343/852 |
| 2018/0316398 A1* | 11/2018 | Wernersson | H04B 7/0469 |

OTHER PUBLICATIONS

Andrews, J. et al, What Will 5G Be? IEEE Journal on Selected Areas in Communications, vol. 32, No. 6, June 2014, 18 pages.

Chu, L.J., "Physical limitations of omni-directional antennas," J. Appl. Phys., vol. 19, No. 12, Dec. 1948, 26 pages.

Harrington, R. F., "Effect of antenna size on gain, bandwidth, and efficiency," J. Res. Nat. Bur. Stand, vol. 64, No. 1, Jan.-Feb. 1960, 12 pages.

Wheeler, H., "Small antennas," IEEE Trans. Antennas Propag., vol. 23, No. 4, Jul. 1975, 8 pages.

Ilvonen, J. et al., "Multiband frequency reconfigurable 4G handset antenna with MIMO capability," Prog. Electromagn. Res., vol. 148, 2014, 11 pages.

Caporal Del Barrio, S. et al., "Novel architecture for LTE worldphones," IEEE Antennas Wireless Propag. Lett., vol. 12, 2013, 4 pages.

Valkonen, R. et al., "Frequency-reconfigurable mobile terminal antenna with MEMS switches," in Proc. 4th Eur. Conf. Antennas Propag. (EuCAP), Barcelona, Spain, Apr. 2010, 5 pages.

Valkonen, R. et al., "Capacitive coupling element antennas for multi-standard mobile handsets," IEEE Trans. Antennas Propag., vol. 61, No. 5, May 2013, 9 pages.

Li, Y., et al. "A compact heptaband loop-inverted F reconfigurable antenna for mobile phone," IEEE Trans. Antennas Propag., vol. 60, No. 1, Jan. 2012, 4 pages.

Rodrigo, D. et al., "Frequency, radiation pattern and polarization reconfigurable antenna using a parasitic pixel layer," IEEE Trans. Antennas Propag., vol. 62, No. 6, Jun. 2014, 6 pages.

Xiao-Lin, Y. et al., "Frequency reconfigurable antenna for wireless communications using GaAs FET switch," IEEE Wireless Antennas Propag. Lett., vol. 14, 2015, 4 pages.

Hannula, J. et al., "Concept for Frequency-Reconfigurable Antenna Based on Distributed Transceivers", IEEE Antennas and Wireless Propagation Letters, vol. 16, 2017, 4 pages.

* cited by examiner

MIMO ANTENNA ARRANGEMENT

CROSS-REFERENCE TO RELATED APPLICATIONS

This application is a continuation of International Application No. PCT/EP2017/054468, filed on Feb. 27, 2017, the disclosure of which is hereby incorporated by reference in its entirety.

TECHNICAL FIELD

The present application relates to the field of wireless communications, and more particularly to an antenna arrangement.

BACKGROUND

In wireless communications, an antenna is a critical component. It is responsible for transmitting and receiving the radio waves used in communications. If more spectrum is available for the communications, the antenna should also be able to cover that spectrum. However, to take advantage of MIMO, multiple-input and multiple-output, several antennas need to be installed on a device. This limits the volume available for each antenna and causes additional challenges of mutual coupling and correlation between the antennas.

Traditionally, a device would only transmit or receive on one channel. However, with 5G and later releases of 4G, the use of Carrier Aggregation (CA) has been proposed. In CA, the device can transmit or receive on several channels simultaneously for increased data rate. This makes frequency tuning more challenging, as the antenna would have to be tuned to several frequencies at the same time.

The use of MIMO, and optionally carrier aggregation necessitates new kinds of antenna solutions in wireless devices.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a MIMO antenna arrangement. The object is achieved by the features of the independent claims. Further implementation forms are provided in the dependent claims, the description and the figures.

According to a first aspect, a device comprises: antennas, each antenna comprising antenna elements; and a signal processor; wherein the signal processor is configured to: receive an input signal for a multiple-input multiple-output (MIMO) operation; generate complex weights; generate feed signals based on the input signal and the complex weights; and provide the feed signals to the antenna elements so that the MIMO operation uses at least two antenna elements from two different antennas. Decoupling losses and correlation between the antenna elements may be mitigated, and accordingly the MIMO performance and capacity increased.

In a first possible implementation of the device, the antenna elements used for the MIMO operation form an antenna cluster for the MIMO operation. The antenna cluster can be formed dynamically for the indented MIMO operation.

In a second possible implementation of any preceding device, the signal processor is configured to receive a plurality of input signals for a plurality of MIMO operations and to generate a plurality of feed signals based on the plurality of input signals and the complex weights, and to adaptively establish antenna clusters by providing the feed signals to the antenna elements, wherein antenna elements used for a MIMO operation form an antenna cluster for such MIMO operation. The antenna cluster may be dynamically formed for the whole MIMO transmission or reception by individual MIMO operations for the MIMO channels of the transmission. A complex weight may be generated for the intended MIMO channel, and collectively for the whole MIMO transmission or reception.

In a third possible implementation of the second possible implementation of the device, the complex weights establish the antenna clusters. The complex weights are used to form and control the intended antenna clusters.

In a fourth possible implementation of any of the $1^{st}$-$3^{rd}$ possible implementation of the device, the complex weights are configured so as to establish the antenna clusters from the antenna elements on the basis of combinations of the antenna elements for the MIMO operation. The device may have a predefined list of possible antenna element combinations. It may also create and process such a list.

In a fifth possible implementation of any of the $1^{st}$-$4^{th}$ possible implementation of the device, the antenna clusters are based on possible combinations of the antenna elements; or the antenna clusters are based on available combinations of the antenna elements as determined by the signal processor. The options and availability of the antenna clusters may be preset so that the processing power of the signal processor and the device is able to generate appropriate complex weights.

In a sixth possible implementation of any of the $1^{st}$-$5^{th}$ possible implementation of the device, each antenna cluster comprises different antenna elements; or each antenna cluster further comprises different antenna elements of the same antenna. The antenna cluster may further have antenna elements from the same antenna, or from at least two different antennas.

In a seventh possible implementation of any preceding possible implementation of the device, the signal processor is configured to generate a complex weight for each antenna element. Consequently, each antenna element can be individually configured to the appropriate antenna cluster.

In an eighth possible implementation of any preceding possible implementation of the device, the complex weights are based on electromagnetic coupling between the antenna elements; or the complex weights are based on electromagnetic scattering between the antenna elements. Negative coupling or correlation between two or more antenna elements may be mitigated by appropriate complex weights, which may be based on the characteristics of the antenna elements.

In a ninth possible implementation of any preceding possible implementation of the device, the antenna elements are adaptively clustered so that antenna elements with strong coupling are organized in the same cluster and antenna elements with low coupling are organized in different clusters. The antenna elements which are in their electrical characteristics close to each other may be bundled in the same cluster.

In a tenth possible implementation of any preceding possible implementation of the device, the complex weights are further based on the MIMO operation between the device and another device; or the complex weights are further based on electromagnetic radiation between the device and another device; or the complex weights are further based on data of the MIMO operation between the device and another device. The complex weights can be further adjusted based on MIMO communications between the device and another device. This may further improve the MIMO communications between these devices.

In an eleventh possible implementation of any preceding possible implementation of the device, the feed signals for the antenna elements are configured to differ only in phase and amplitude. This means that signals having the same shape can be fed to the antenna elements. This makes the output signal from the antennas predictable, desirable, and easy to control.

According to a second aspect, a method comprises: communicating by antennas, each antenna comprising antenna elements; receiving an input signal for multiple-input multiple-output (MIMO) transmission or reception; generating complex weights; generating feed signals based on the input signal and the complex weights; providing the feed signals to the antenna elements so that the MIMO transmission or reception uses at least two antenna elements from two different antennas. Decoupling losses and correlation between the antenna elements may be mitigated, and accordingly the MIMO performance and capacity increased.

According to a third aspect, a computer program is provided, comprising program code configured to perform a method according to the second aspect when the computer program is executed on a computer.

A number of antenna arrangements according to any of the preceding implementations may be configured in the same device on the same frequency to realize a part of the MIMO system.

Many of the attendant features will be more readily appreciated as they become better understood by reference to the following detailed description considered in connection with the accompanying drawings.

BRIEF DESCRIPTION OF THE DRAWINGS

The present description will be better understood from the following detailed description read in light of the accompanying drawings, wherein.

Like references are used to designate like parts in the accompanying drawings.

DETAILED DESCRIPTION OF ILLUSTRATIVE EMBODIMENTS

Figure 1:
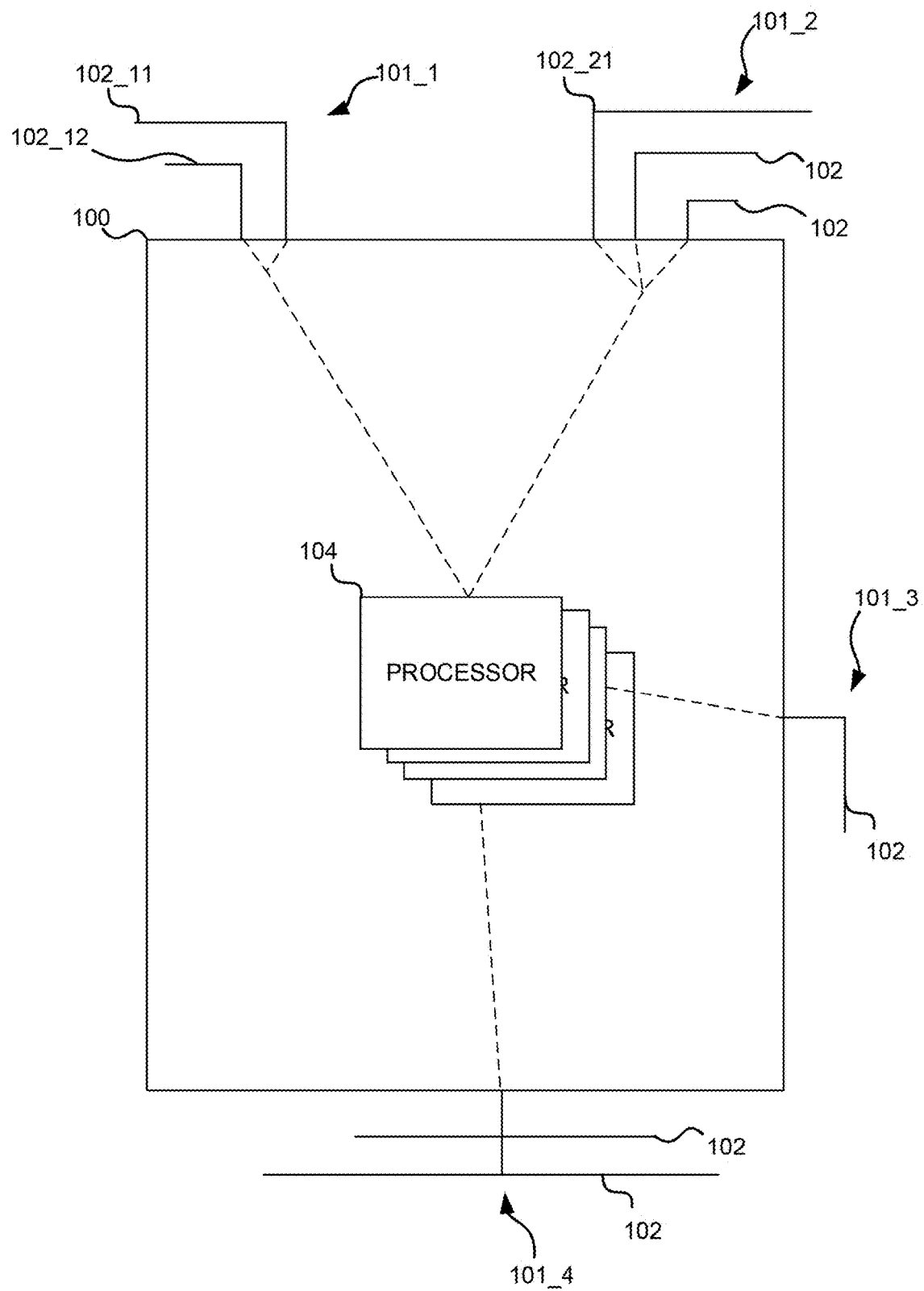
FIG. 1 illustrates a schematic representation of a device configured for multiple-input and multiple-output, MIMO, operations wherein complex weights are configured to control the MIMO operations by antenna elements of antennas according to an embodiment.

The detailed description provided below in connection with the appended drawings is intended as a description of the embodiments and is not intended to represent the only forms in which the embodiment may be constructed or utilized. However, the same or equivalent functions and structures may be accomplished by different embodiments.

In radio, multiple-input and multiple-output (MIMO) is a technique for multiplying the capacity of a radio link using multiple transmit and receive antennas and their antenna elements to exploit multipath propagation. MIMO is configured for sending and receiving more than one data signal simultaneously over the same radio channel by exploiting multipath propagation. MIMO systems can be defined as the use of multiple antennas at the transmitting as well as receiving ends of a wireless communication network. The systems take advantage of multipath transmission paths.

According to an embodiment, a device comprises antennas, each antenna having antenna elements that are configured for MIMO operations. Each antenna element comprises a feed for a feed signal. The device comprises a signal processor that receives an input signal. The input signal represents a MIMO channel, wherein the whole MIMO transmission can be divided into appropriate channels. The signal processor also generates complex weights, for example, for each antenna element. The signal processor may receive the characteristics of the antenna elements and determine the complex weights accordingly. The signal processor combines the input signal and the complex weight and generates the feed signal for each antenna element. The feed signal is intended for the MIMO operation. Based on the feed signal, or in more detail based on the complex weight(s) based on which the feed signal is based, the antenna elements establish antenna clusters for the MIMO operations. This may be based on the characteristics of the antenna elements. Antenna elements from different antennas may be used to create an antenna cluster. The established antenna clusters are configured to optimize the MIMO transmission. Each MIMO channel is transmitted in the MIMO operation by the respective antenna cluster. Consequently, the whole MIMO transmission is performed when all established antenna clusters transmit. A MIMO operation may refer to a communication on one or more MIMO channel between devices. A MIMO operation can for example be a MIMO transmission but can also be a bidirectional MIMO communication.

Furthermore, the signal processor may receive characteristics of the data communication of the MIMO operations between devices. The signal processor may further apply these characteristics in generating the complex weights for optimizing the MIMO operations. The feed signals are generated based on the antenna clusters for the MIMO operations between the devices.

According to an embodiment, the signal processor may determine the available combinations of the antenna elements for the MIMO operations.

The MIMO transmission may be optimized by exploiting a frequency configurable antenna based on distributed signal processors. This may provide increased throughput or improved quality (signal-to-noise ratio) of the MIMO operations, for example for the $5^{th}$ generation (5G) mobile MIMO system. The antenna elements used in the MIMO system can be dynamically clustered for optimized throughput (for example data rate) of the system. Any combination of clusters of the antenna elements may be used for achieving the highest possible throughput. The performance of the antenna clusters used for MIMO may be improved. Different antenna elements are fed such that losses due to mutual coupling may be reduced and the total MIMO capacity increased. Optionally, instead of dedicating one antenna for each MIMO channel, the elements of the antenna may be combined in multiple antenna clusters. The effect of mutual coupling may not be completely eliminated, but it may be improved. The antenna clusters can be dynamically created for respective MIMO channels based on the circumstances.

The MIMO operations relate to the antenna cluster concept, where each antenna has several antenna elements. An antenna element may be a smaller part of the antenna, whereby an antenna has possibly from one up to several different antenna elements. They may be physically located close to each other, or be otherwise closely related in their radiation characteristics.

The antennas of the device are configured for MIMO operations, after which these "virtual" antennas, thus antenna clusters, can be used for the MIMO transmission or reception similarly to conventional antennas. Typically, for example, a 4×4 MIMO device has four antennas. However, in the embodiments, the number of individual antenna elements may be larger than the practised MIMO signals. These antennas may then be clustered adaptively according to need. For example, when operating in a frequency at which the antennas do not work particularly well, the signal-to-noise ratio SNR is poor, or for example the base station supports only 2×2 MIMO, the antennas can form, for example, two clusters. On the other hand, if the SNR is good, the effectivity of an individual cluster can be sacrificed in order to increase the number of clusters, which increases the overall throughput. With respect to the MIMO signals, the number of "antennas", i.e. the antenna clusters, changes, but the MIMO operations can work just as usual. In other words, no special treatment on the MIMO signals has to be performed.

Although embodiments have been described relating to the MIMO operation of transmission, the embodiments are also applicable to the MIMO operation of reception. The embodiment of reception is generally similar to the embodiment of transmission. Similarly to the MIMO transmission, in the MIMO reception the signal processor configures antenna elements based on the complex weights. It generates the appropriate complex weights. The complex weights may depend on the characteristics of the antenna elements, and they may be, for example, preset by the receiving device.

Figure 2:
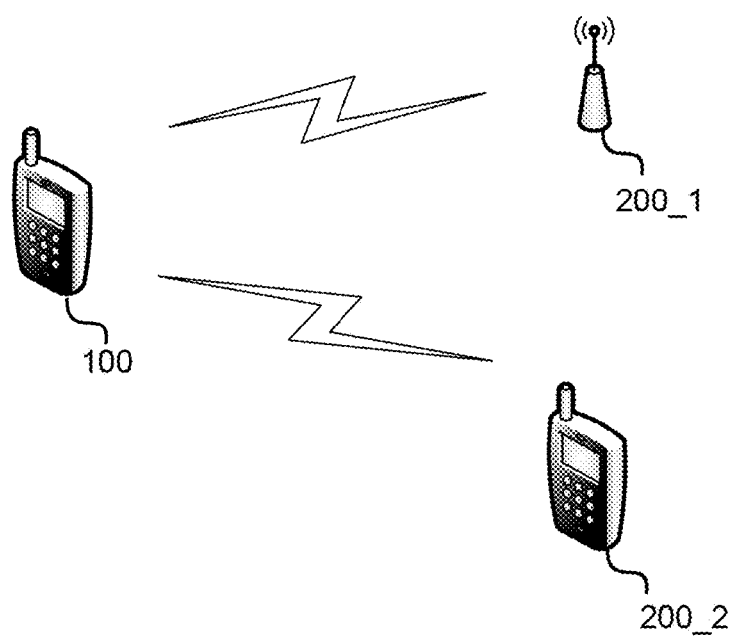
FIG. 2 illustrates a schematic representation of a system having the device and other devices wherein the MIMO operations are controlled by the complex weights based on the MIMO operations between the devices according to an embodiment.

FIGS. 1 and 2 show schematically a device 100, such as a wireless device, in a wireless communication system. The device 100 comprises antennas 101. The wireless communication system also comprises another communication device, such as a base station 200 which may also comprise a similar antenna 101. The arrows in FIG. 2 represent transmissions or receptions between the device 100 and another device 200.

The device 100 may be any of a User Equipment (UE) in Long Term Evolution (LTE), mobile station (MS), wireless terminal or mobile terminal which is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA) which is any device that contains an IEEE 802.11-conformant Media Access Control (MAC) and Physical Layer (PHY) interface to the Wireless Medium (WM).

Another communication device 200 may be similar to the device 100. Furthermore, it may also be a base station, a network node (e.g. a radio network node) or an access node or an access point or a base station, e.g., a Radio Base Station (RBS), which in some networks may be referred to as transmitter, "eNB", "eNodeB", "NodeB" or "B node", depending on the technology and terminology used. The radio network nodes may be of different classes such as, e.g., macro eNodeB, home eNodeB or pico base station, based on transmission power and thereby also cell size. The radio network node can be a Station (STA) which is any device that contains an IEEE 802.11-conformant Media Access Control (MAC) and Physical Layer (PHY) interface to the Wireless Medium (WM).

Referring to FIG. 1, it illustrates a schematic representation of a device 100 configured for multiple-input and multiple-output, MIMO, operations wherein complex weights are configured to control the MIMO operations by different antenna elements 102 of antennas 101 according to an embodiment.

The device 100 comprises antennas 101, for example four antennas 101_1, 101_2, 101_3, 101_4 as illustrated in FIG. 1. Each antenna 101 comprises one or more antenna elements 102. As described above, the antenna elements 102 of the same antenna 101 can be located at a close proximity to each other as is the case in device 100. Different antenna elements 102 of the same antenna 101 can have different physical dimensions as is exemplarily shown by their different lengths in FIG. 1. The different physical dimensions of the antenna elements 102 mean that they have different electromagnetic properties e.g. resonance frequencies. The device 100 also comprises a signal processor 104, which may be an example of a signal processing device. Although FIG. 1 illustrates four signal processors, the device 100 may have several distributed signal processors so that each antenna 101 has a signal processor of its own. Each signal processor 104 is electrically coupled to a feed of a respective antenna element 102 as shown by the dashed lines in FIG. 1.

The signal processor 104 is configured to receive an input signal which is intended to be communicated via MIMO.

The input signal may be a representation of a MIMO channel, wherein the intended whole MIMO transmission is divided into MIMO channels. The signal processor may be further configured to perform the division operation; however, the MIMO signal may be divided into the respective MIMO channels prior to arriving at the signal processor. According to an embodiment, the number of the MIMO channels corresponds with the number of the used antenna clusters. Consequently, the signal processor may give feedback for the division operation.

The signal processor 104 is further configured to obtain a complex weight. A complex weight is obtained for each antenna element, and may be processed by the signal processor of the antenna element. The complex weights may be obtained in one of many different ways as will be described in more detail below. The signal processor 104 is further configured to generate feed signals based on the input signal and the complex weights. A feed signal is generated for each antenna element based on the complex weight of the antenna element and the input signal. Consequently, each antenna element receives an individual feed signal. The feed signal controls the frequency characteristic of the respective antenna element 102.

Thus, the complex weights are chosen to achieve the desired frequency characteristics of the antenna elements so as to establish appropriate antenna clusters for MIMO operations. A portion of the signal from an antenna element 102 will reflect back and another portion of the signal from the antenna element 102_11 couples to another antenna element 102_12. The signal from the antenna element 102_11 also interferes with the signal from another antenna element 102_12. Respectively, a portion of the signal from another antenna element 102_12 will reflect back and another portion of the signal from the antenna element 102_12 couples to the antenna element 102_11. This may be applicable to all antenna elements 102 of the device 100. Consequently, by controlling the complex weights, the antenna clusters that are established from the antenna elements 101 may be controlled. According to the described embodiment, the feed signals may only differ in phase and amplitude. This is advantageous for controlling the establishment of the antenna clusters for the MIMO operations.

There may be electromagnetic reflections or coupling between the antenna elements 102. Furthermore there may be scattering between the antenna elements 102. According to an embodiment, the complex weights are based on the electromagnetic scattering between the antenna elements 102. For example, the scattering may be a sum of the reflections back to an antenna element and another antenna element and the mutual coupling between these antenna elements. The scattering parameters $S_{nn}$ together form a scattering matrix S.

Consequently, the antennas 101 with antenna elements 102 may be used in a closely spaced cluster to obtain efficient frequency-reconfigurable operation. This is obtained by weighting the input signals to each antenna element 102 in an appropriate way. The complex weights, such as optimal feed weighting coefficients, and the corresponding efficiency η can be obtained from the following equation:

$$\eta = \max[eig\{I - S^H S\}],$$

where S is the scattering matrix of the antenna element 102, I is the identity matrix, H is the conjugate transpose. In this equation, the signal processor 104 is configured to solve the eigenvalues of $I-S^H S$, and select appropriate eigenvalues with the highest efficiency, as for example described below.

When the signal processor 104 processes this further for the MIMO operation, the signal processor 104 (or multiple distributed signal processors) may optimize each antenna element 102 independently of each other. If each antenna element 102 is optimized separately, representing each element with an n-by-n scattering matrix S1 ... SN, the situation will be equivalent to solving the eigenvalues for the scattering matrix:

$$S = \begin{bmatrix} \begin{bmatrix} S1_{11} & \cdots & S1_{1n} \\ \vdots & \ddots & \vdots \\ S1_{n1} & \cdots & S1_{nn} \end{bmatrix} & \cdots & 0 \\ \vdots & \ddots & \vdots \\ 0 & \cdots & \begin{bmatrix} SN_{11} & \cdots & SN_{1n} \\ \vdots & \ddots & \vdots \\ SN_{n1} & \cdots & SN_{nn} \end{bmatrix} \end{bmatrix}$$

where the n-by-n antenna elements 102 appear as submatrices on the diagonal, and the other elements of the matrix are zero.

When the signal processor 104 calculates the values for the above matrix, it can obtain values that correspond to the eigenvalues of each submatrix. If there are N antennas 101, the N largest eigenvalues will equal the largest eigenvalues of all the antenna elements.

Instead of considering each antenna or potential antenna element separately, the signal processor 104 configures them in unison, thus considering each one of them individually for establishing appropriate antenna clusters. For example, instead of eight antennas each having four antenna elements, the signal processor 104 is configured to consider the entire antenna arrangement of 32 antenna elements, and consequently instead of using only the largest eigenvalue from each of the 8 antennas, the signal processor 104 is configured to use the 8 largest eigenvalues of the 32-by-32 antenna arrangement. Thereby, the signal processor 104 is configured to establish antenna clusters, even out of different antennas with their antenna elements. This is illustrated in embodiments of the following figures.

According to an embodiment, each antenna element 102 can be individually fed by the one or more distributed signal processors 104. Typically, the mutual coupling is weak between certain antenna elements 102, while it is stronger between the others 102. This may be determined by the scattering parameters S, for example as described above. In such a case, the antenna elements could be dynamically clustered such that the antenna elements 102 with stronger coupling are organized in the same cluster, whereas antenna elements 102 with lower coupling are placed in different clusters. The signal processor 104 is configured to determine the appropriate antenna cluster by controlling the complex weights so that each feed signal to each antenna element 102 is configured to form the appropriate antenna clusters. The signal processor 104 receives information about the characteristics of the antenna elements 102 so that the degree of coupling may be obtained or determined. This facilitates obtaining the complex weight in a simpler way while still achieving a reasonable MIMO channel capacity and reasonably low losses due to mutual coupling.

Although the embodiments illustrate the creation of the antenna clusters for MIMO operations based on coupling between the antenna elements 102, this is only an illustrative example and not a limitation. According to an embodiment, the network connectivity of the MIMO channels may be further used to determine the complex weights for creating the antenna clusters for the MIMO operations. FIG. 2 illustrates an embodiment, wherein another communication device 200 feeds back information of the MIMO data communications. The device 100 receives this information, and uses it to further determine the complex weights. For example, all UEs forward their MIMO operation parameters such as rate requirements, SNRs, and the values to a single (e.g. central) UE which is responsible for the MIMO operations. When receiving this information, the communication device 100 feeds it to the signal processor 104 which further configures the complex weights based on this information. The device 100 may be configured to generate the complex weights from far field information, for example from the MIMO channel. As described above, the signal processor 104 can be configured to use scattering parameters $S_{nn}$ to optimize the complex weights. Alternatively or in addition, the signal processor 104 uses far field results of the wireless communications to further configure the complex weights. This may further adjust the antenna cluster to improve the MIMO operations, alternatively or in addition to the scattering parameters. The signal processor 104 may be configured to determine the radiation matrix D from the scattering matrix as follows:

$$D = I - S^H S$$

The calculation above may work well in a lossless case, and not be valid in a lossy (e.g. noisy) case. In a noisy case, the signal processor 104 may be configured to obtain the radiation matrix $D_{i,j}$ directly from the far field as follows:

$$D_{i,j} = \frac{1}{4\pi} \oint F_i^H(\theta, \phi) F_j(\theta, \phi) \sin\theta d\phi d\theta$$

where $F_i$ are the normalized radiation patterns corresponding to each antenna element 102.

Figure 3:
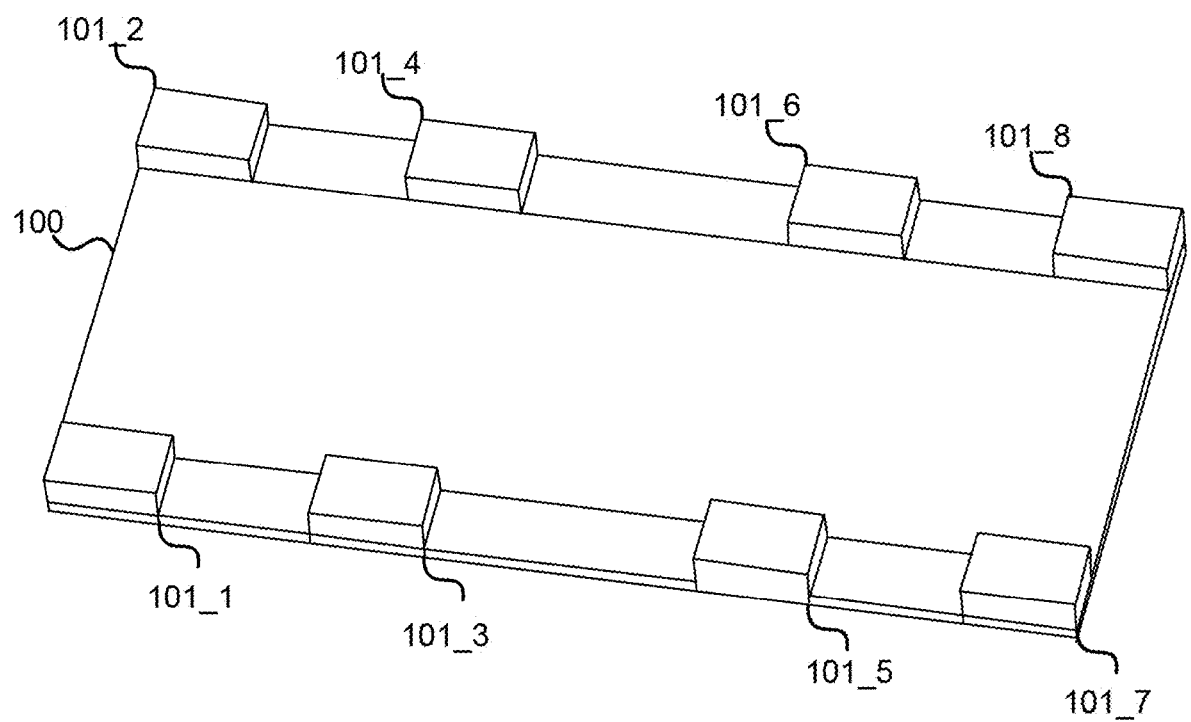
FIG. 3 illustrates a schematic representation of a device comprising antennas, each antenna having antenna elements for establishing the antenna clusters according to an embodiment.

FIG. 3 illustrates an embodiment having eight antennas 101_1, 101_2, 101_3, 101_4, 101_5, 101_6, 101_7, 101_8, each antenna tot having four antenna elements (not shown in FIG. 3). Because there are eight antennas 101, eight eigenvalues may be used for determining the antenna clusters. Although FIG. 3 illustrates an example having eight antennas 101, it should be noted that the number of antennas and antenna elements may vary, and eight antennas each with four antenna elements is merely for illustration purposes and not a limitation.

Figure 4:
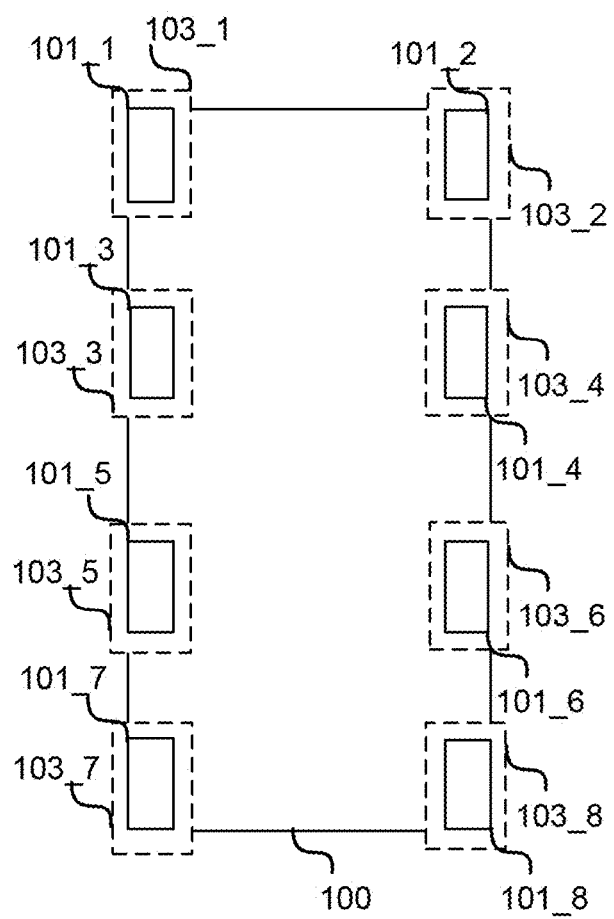
FIG. 4 illustrates a schematic representation of a device comprising antenna clusters of the antennas, wherein each antenna establishes an antenna cluster according to a comparative example.

FIG. 4 illustrates a schematic representation of a device 100 comprising antenna clusters 103, wherein each antenna 101 establishes its own an antenna cluster 103. FIG. 4 illustrates a comparative example, wherein each MIMO channel has its own antenna cluster. The MIMO channel is related to a MIMO data stream in general. The MIMO streams relate to MIMO signals to be transmitted or received. The MIMO channel may refer to the environment along the MIMO streams are processed.

Figure 5:
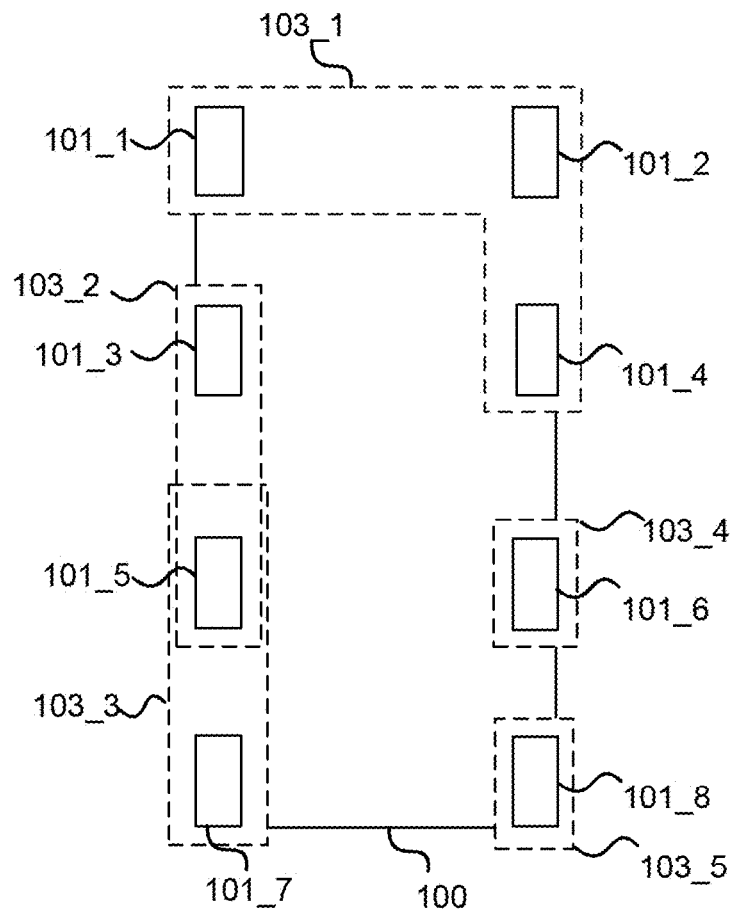
FIG. 5 illustrates a schematic representation of a device wherein complex weights are configured to establish antenna clusters from antenna elements of different antennas according to an embodiment.

FIG. 5 illustrates a schematic representation of a device 100 wherein complex weights are configured to establish antenna clusters 103 from the antenna elements (not shown in FIG. 5) of different antennas according to an embodiment. A MIMO channel is created from multiple antennas 101 based on a combination that gives the optimum throughput for the MIMO transmission.

In the embodiment of FIG. 5, the signal processor (or the group of signal processors) establishes five different antenna clusters 103_1 . . . 103_5. Antenna cluster 103_1 comprises antennas 101_1, 101_2 and 101_4 with their antenna elements. Antenna cluster 103_2 comprises antennas 101_3 and 101_5. Antenna cluster 103_3 comprises antennas 101_5 and 101_7. Furthermore, antenna cluster 103_4 comprises antenna 101_6 and antenna cluster 103_5 comprises antenna 101_8. All antenna elements of each antenna 101, except for antenna 101_5, are configured to the same cluster 103. Antenna 101_5 is configured to both clusters 103_2 and 103_3. A portion of antenna elements of antenna 101_5 is allocated to cluster 103_2, and another portion of antenna elements of antenna 101_5 is allocated to cluster 103_3. All this clustering is performed by choosing the complex weights for the different antenna elements accordingly.

FIG. 5 illustrates an example of arranging the antenna clusters 103 according to the antenna coupling, and possibly feedback received from another device 200 as described in the embodiments. For example, the signal processor may configure the complex weights so that undesired couplings between the antenna elements 102 may be reduced. Furthermore, the signal processor may receive feedback for the complex weights from another device 200 to adjust them further. Five antenna clusters 103_1-103_5 are established for the MIMO transmission. The main input signal can be divided into five MIMO channels. Each MIMO channel is directed to a respective antenna cluster. The MIMO transmission comprises five MIMO channels that are transmitted via respective antenna clusters 103_1-103_5. The signal processors 104 may perform the MIMO channel allocation, or alternatively the MIMO channels are divided prior to the signal is fed into the signal processor 104. In both embodiments, the signal processor configures the complex weights for the antenna elements in order to form the antenna clusters 103_1-103_5.

FIGS. 6-9 illustrate embodiments of a device 100 with different kinds of antenna clusters 103 which the signal processor 104 can be configured to form based on the complex weights. The antenna cluster 103 may be formed of antenna elements 102 of different antennas 101, or even additionally by the antenna elements 102 of the same antenna 101. It should be noted that the device 100 may have more antenna clusters 103 than illustrated in these embodiments. FIGS. 6-9 only illustrate antenna clusters 103 that are formed from two different antennas 101_1, and 101_2.

Figure 6:
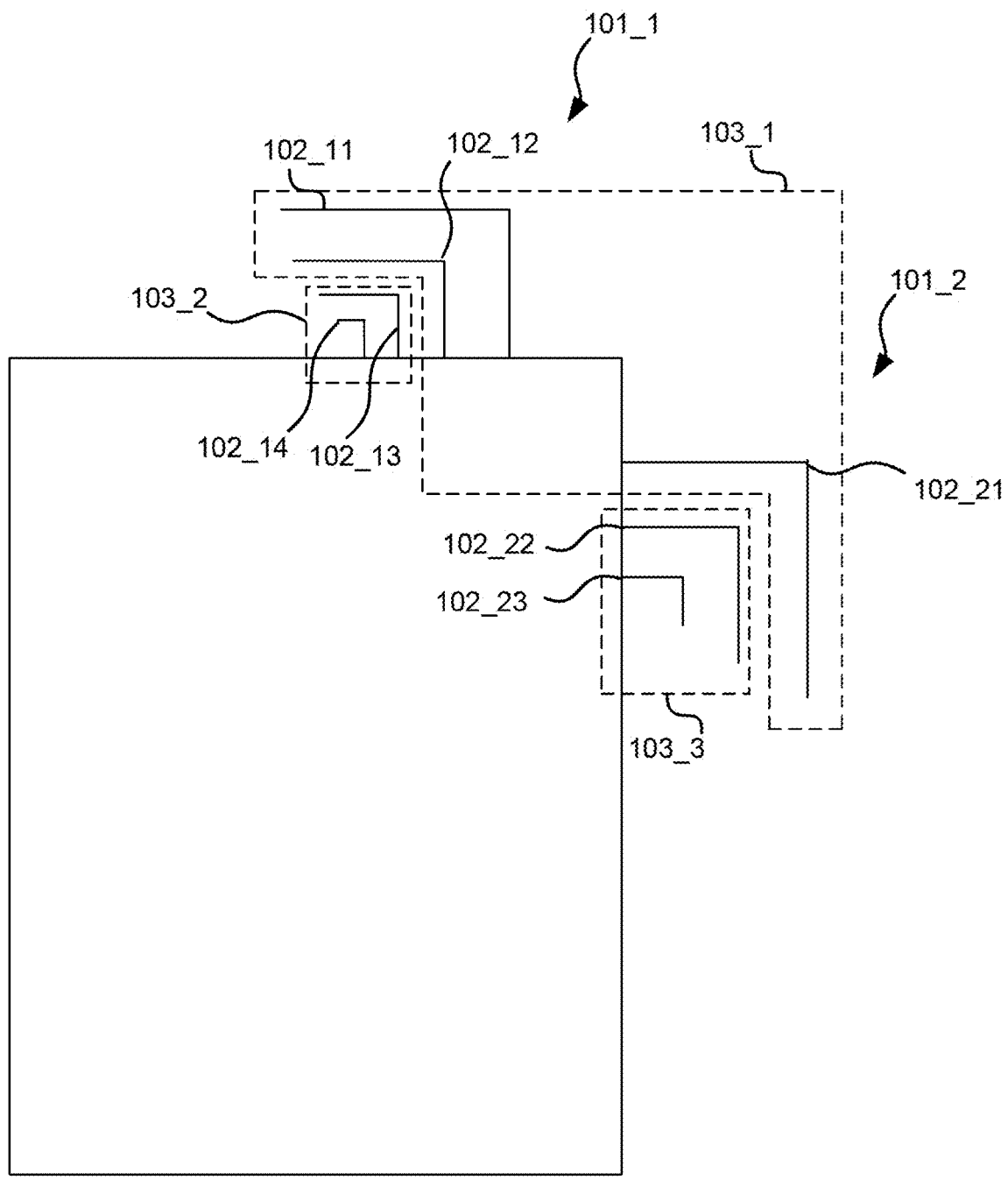
FIGS. 6, 7, 8 and 9 illustrate a schematic representation of a device comprising antenna clusters which are formed by antenna elements of different antennas according to embodiments.

FIG. 6 illustrates a schematic representation of a device 100 comprising antenna clusters 103 according to an embodiment. FIG. 6 illustrates an example of how the antenna elements 102 may be configured into different antenna clusters 103. Antenna 101_1 has antenna elements 102_11, 102_12, 102_13 and 102_14. Antenna 101_2 has antenna elements 102_21, 102_22 and 102_23. Signal processors configure the complex weights so that antenna clusters 103_1, 103_2 and 103_3 are formed. Antenna cluster 103_1 has antenna elements 102_11, 102_12, and 102_21, thus antenna elements from different antennas. Antenna cluster 103_2 has antenna elements 102_13 and 102_14 which are from the same antenna 101_1. Antenna cluster 103_3 has antenna elements 102_22 and 102_23 which are from the same antenna 101_2.

Figure 7:
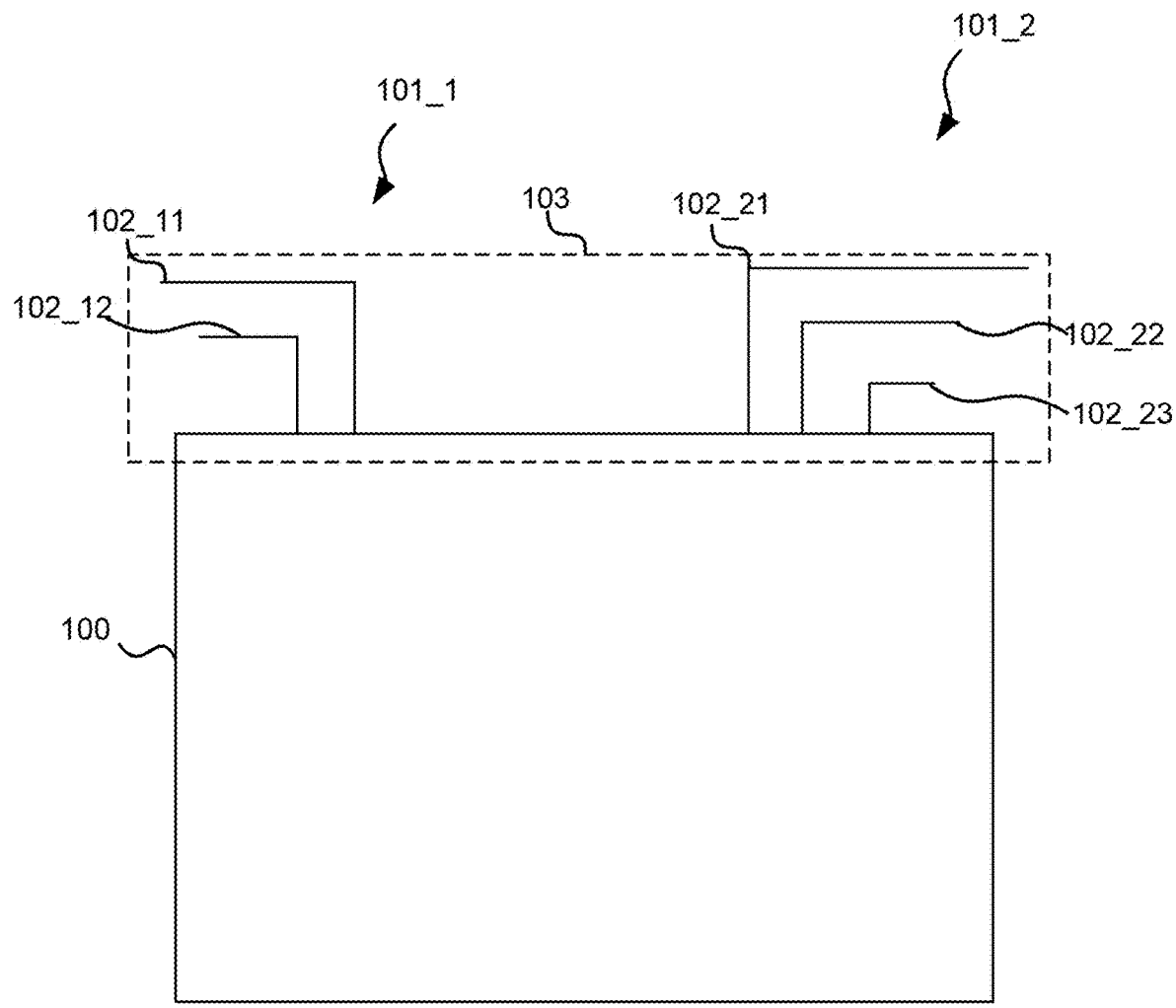

FIG. 7 illustrates a schematic representation of a device 100 comprising an antenna cluster 103 according to an embodiment. FIG. 7 illustrates an example of how the antenna elements 102 of two antennas 101_1 and 101_2 may be configured into a single antenna cluster 103. Antenna 101_1 has antenna elements 102_11, and 102_12. Antenna 101_2 has antenna elements 102_21, 102_22 and 102_23. The signal processors configure the complex weights so that antenna cluster 103 is formed. Antenna cluster 103 has antenna elements 102_11, 102_12, 102_21, 102_22, and 102_23, thus antenna elements from different antennas 101_1 and 101_2.

Figure 8:
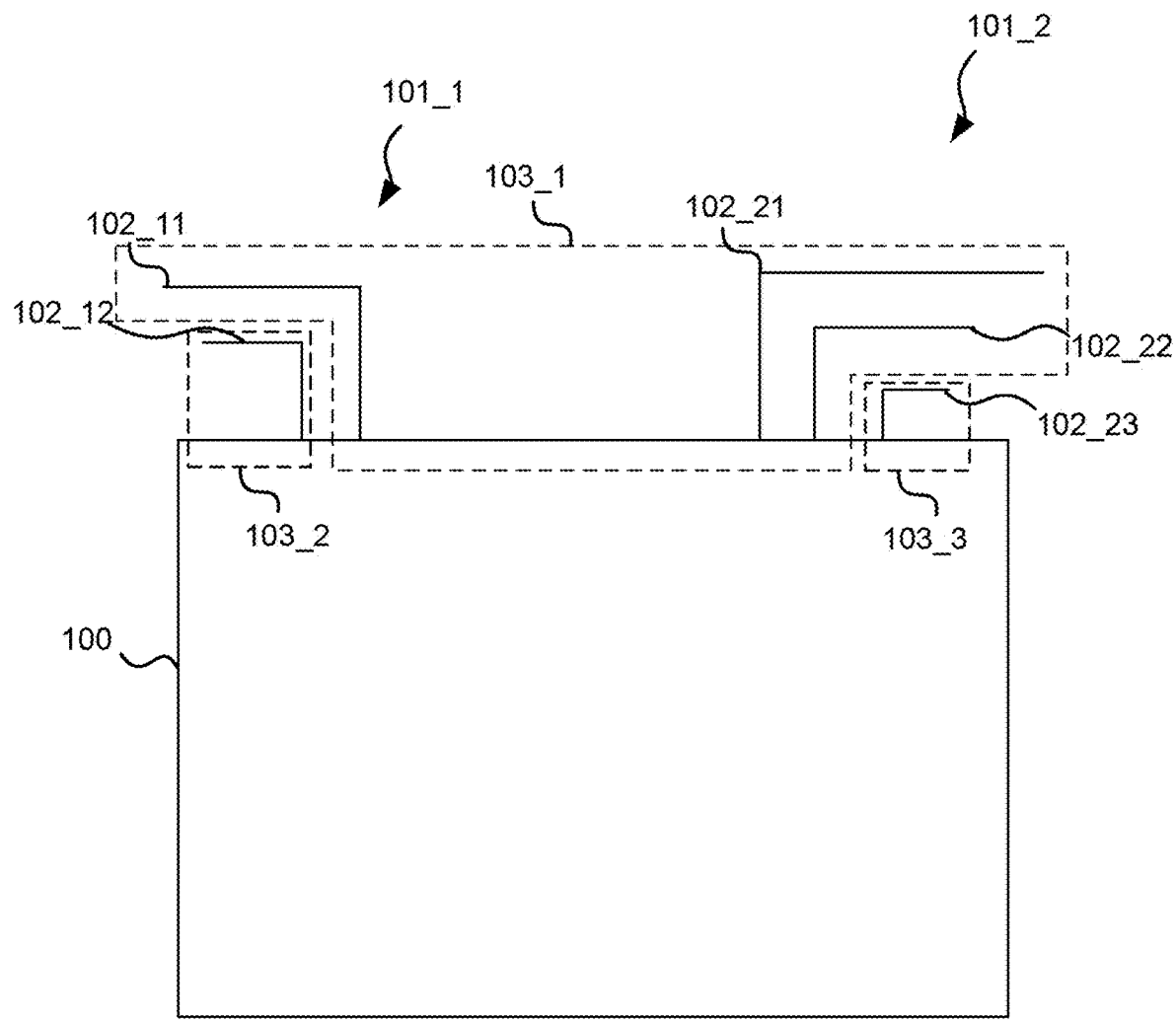

FIG. 8 illustrates a schematic representation of a device 100 comprising antenna clusters 103 according to an embodiment. In FIG. 8, the antenna elements 102 of different antennas 101_1 and 101_2 are configured into antenna clusters 103_1, 103_2, and 103_3. Antenna 101_1 has antenna elements 102_11, and 102_12. Antenna 101_2 has antenna elements 102_21, 102_22 and 102_23. Signal processors configure the complex weights so that antenna clusters 103_1, 103_2 and 103_3 are formed. Antenna cluster 103_1 has antenna elements 102_11, 102_21, and 102_22, thus antenna elements from different antennas. Antenna cluster 103_2 has antenna element 102_12 from antenna 101_1. Antenna cluster 103_3 has antenna element 102_23 which is from antenna 101_2.

Figure 9:
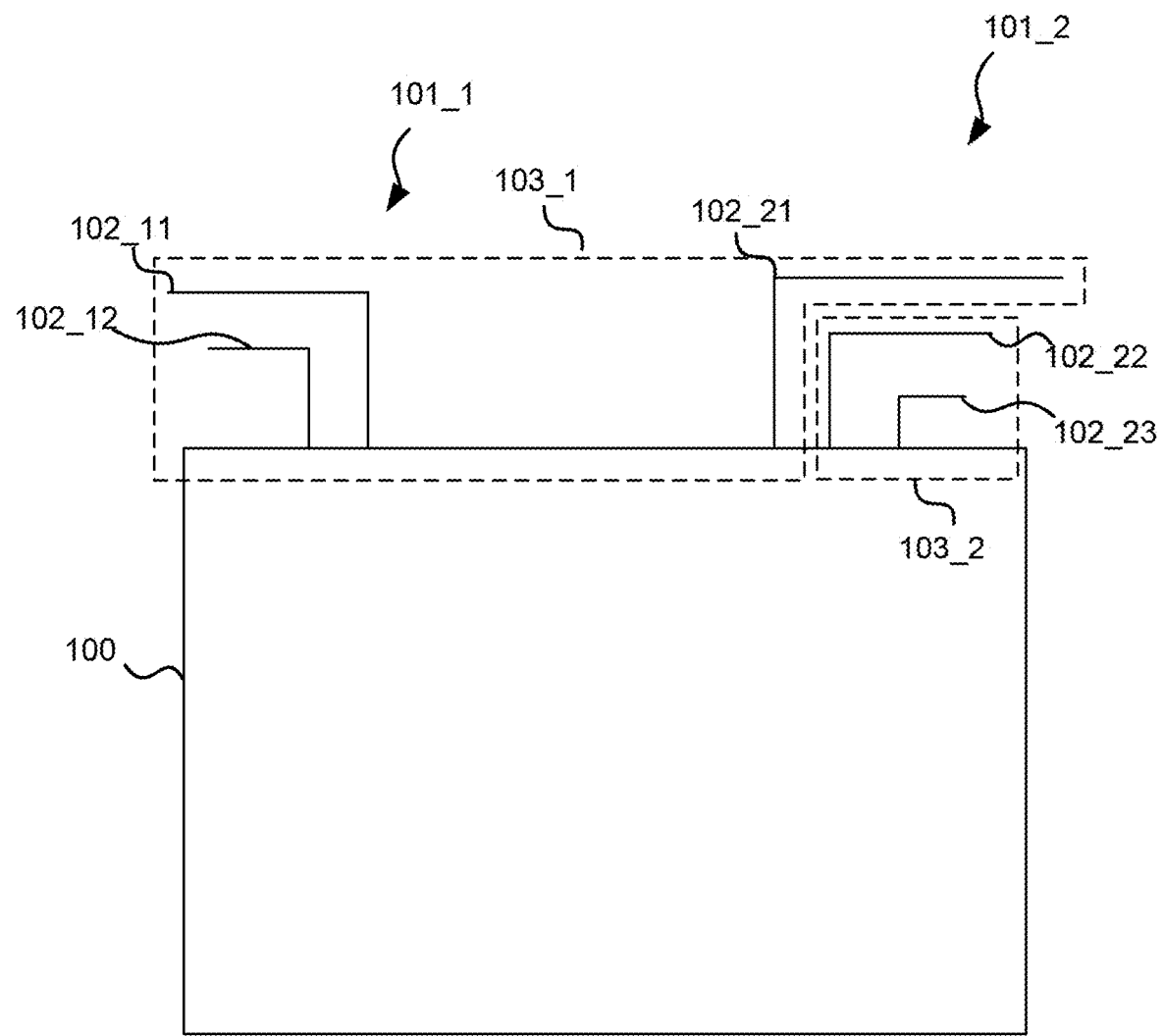

FIG. 9 illustrates a schematic representation of a device 100 comprising antenna clusters 103 according to an embodiment. In FIG. 9, the signal processor has configured the complex weights so that two antenna clusters 103_1 and 103_2 are formed of two different antennas 101. Antenna 101_1 has antenna elements 102_11, and 102_12. Antenna 101_2 has antenna elements 102_21, 102_22 and 102_23. Signal processors configure the complex weights so that antenna clusters 103_1, and 103_2 are formed. Antenna cluster 103_1 has antenna elements 102_11, 102_12, and 102_21, thus antenna elements from different antennas. Antenna cluster 103_2 has antenna elements 102_22 and 102_23 which are from the same antenna 101_2.

Figure 10:
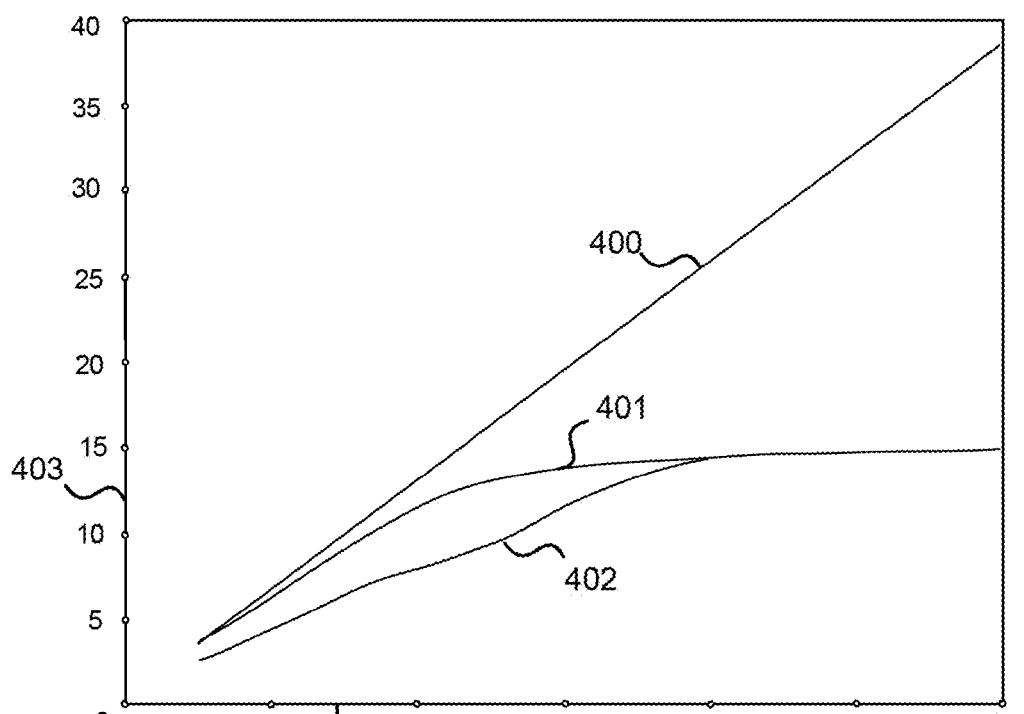
FIG. 10 illustrates an example of simulated capacity of an embodiment.
Figure 11:
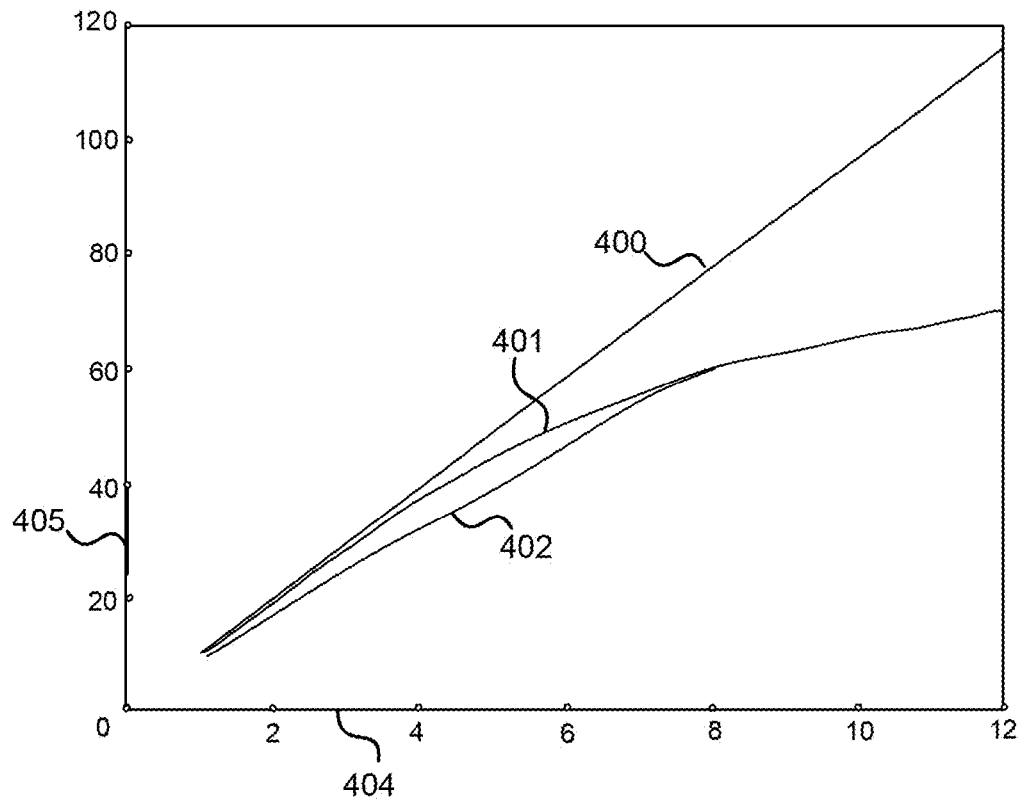
FIG. 11 illustrates another example of simulated capacity of an embodiment.

FIG. 10 illustrates an example of simulated capacity of an embodiment, and FIG. 11 illustrates another example of simulated capacity of an embodiment.

A simulation evaluation of the embodiment is illustrated in FIGS. 10 and 11. In FIGS. 10 and 11, X-axis 404 illustrates a number of MIMO channels having values 0 (origo) to 12 (maximum value), and each step as shown in FIGS. 10 and 11 having an increment of 2. Y-axis 403 illustrates ergodic capacity bits/s/Hz. In FIG. 10 y-axis 404, origo has value 0 and maximum value is 40, with an increment of 5 per each step. In FIG. 11 y-axis 405, origo has value 0 and maximum value is 120, with an increment of 20 per each step. In FIG. 10 the frequency used is 1.7 GHz, a possible low operating frequency of the antenna. FIGS. 10 and 11 illustrate two cases: First, the antenna clusters are combined individually, essentially creating 8 "virtual" antennas from the point of view of the MIMO performance. This is equivalent to having a single antenna element at each cluster (assuming only a single frequency). In FIGS. 10 and 11, this case is referred to as reference 402. Second, according to an embodiment, the entire device 100 is considered, for example, to have separate antennas 101 and their antenna elements 102 resulting in 32 different elements. The MIMO performance is now calculated from the entire 32-by-32 matrix, which is denoted by reference 401.

The ergodic capacity (y-axis reference 403, 405) is calculated by the simulation for the two different cases (references 401, 402) as a function of the number of MIMO channels (x-axis reference 404). The number of channels may be limited by the device itself. The environment is assumed to be infinitely rich and the number of base station antennas is set for example to 32, i.e. large enough not to affect the comparison to a significant degree. Two signal-to-noise ratios are used, 10 (in FIG. 10) and 30 (in FIG. 11) dB. The ideal capacity, assuming perfectly efficient and uncorrelated antennas, is also plotted as reference 400.

When the number of MIMO channels equals the number of clusters, the two approaches (401,402) give similar results as shown at the higher number of MIMO channels starting from 8 or more MIMO channels. In FIGS. 10 and 11 this is illustrated when curves of the references 401 and 402 meet each other at the points 8-12 of the MIMO channels. If the environment supports fewer channels, the embodiment illustrated by reference 401 results in better capacity over the comparative example of reference 402. Alternatively, if the SNR is good enough, the embodiment of reference 401 can provide further improvements for past 8 channels, which the comparative example of reference 402 cannot do due to the limitations imposed by the number of antenna elements. This adaptability is the main advantage of the embodiments.

Figure 12:
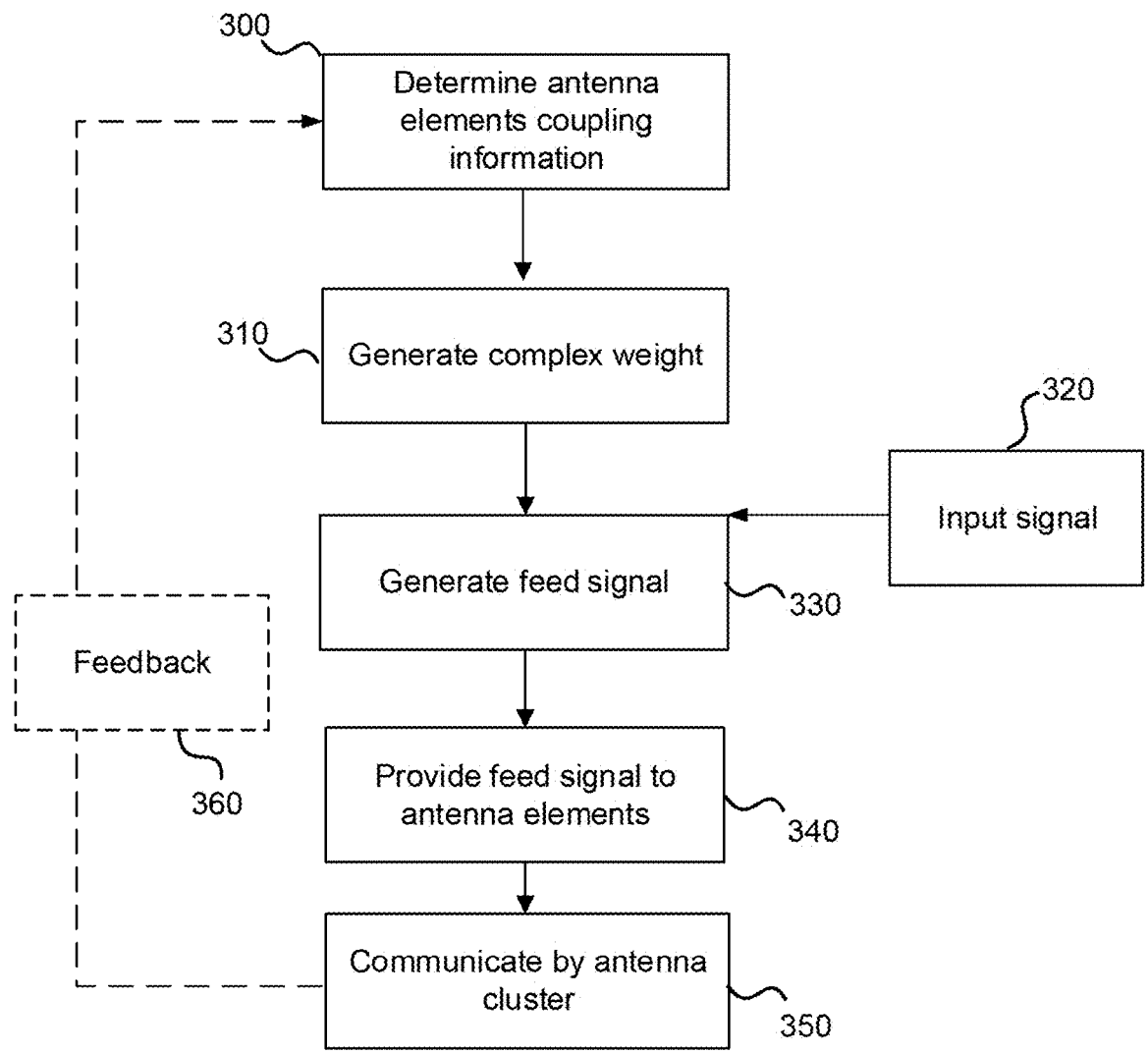
FIG. 12 illustrates a flowchart showing a method of establishing antenna clusters for MIMO transmission according to an embodiment.

FIG. 12 illustrates a flowchart showing a method of establishing antenna clusters 103 for MIMO operation according to an embodiment. In FIG. 12, antenna clusters 103 are formed for a MIMO operation. When the MIMO transmission has several MIMO channels, the method of FIG. 12 may be performed for each MIMO channel so as to establish multiple MIMO operations for the whole MIMO transmission.

In operation 300, parameters are determined for antenna elements 102. These parameters may be detected or measured. For example, the device 100 sends a probe signal to each antenna element 102 for detecting the degree of coupling between the antenna elements 102 for a certain frequency or radio signal in general. The degree of coupling may also be determined alternatively, for example as a default parameter for each antenna element 102. The parameters may be determined by the signal processor 104, e.g. based on the above mentioned detections or measurements.

Operation 310 generates a complex weight. The complex weight is generated for an antenna elements 102 of an antenna cluster 103. Complex weight may be generated based on the parameters of the antenna element 102. Complex weight may also be generated based on how different antenna elements 102 affect each other. Complex weight may also be generated based on characteristics of the input signal so as to appropriately configure the input signal with respect to the intended antenna element 102, into which the input signal is feed after modification by the complex weight. The parameters of the antenna elements are used to generate the appropriate complex weight for each antenna element so as to establish an optimal antenna cluster for the MIMO channel. According to an embodiment, feedback of the operation 360 may further be used to adjust the complex weight. The feedback adjusts the complex weight based on system level data communication, for example in case a better data communication can be achieved by different configuration of the complex weight.

Similarly to operation 310, a complex weight may be generated for each antenna elements 102 that is intended for the MIMO transmission (or reception).

Operation 320 inputs a signal. The signal represents a MIMO channel having data. The whole data for the MIMO transmission may be divided into different MIMO channels. The signal representing one of the MIMO channels is inputted to the signal processor 104 in operation 320.

Operation 330 generates a feed signal. The feed signal is generated based on the generated complex weight and the received input signal. The feed signal is configured by the complex weight so that the complex weight adjusts the feed signal with respect to amplitude and phase. The feed signal is optimized with respect to the intended antenna element 102 so that the feed signal tunes and configures the antenna element 102 in order to form the antenna cluster 103 with other antenna elements 102 accordingly.

Corresponding to operation 330, a similar operation is performed for each antenna element 102. Another generated complex weight of another antenna element 102 is used to configure the input signal in order to generate the feed signal of the other antenna element 102. When this is operated for each intended antenna elements 102, the antenna clusters 103 for the MIMO transmission are established.

In operation 340, the feed signal is provided to the antenna element 102. The feed signal is fed to the antenna elements 102 by the signal processor. Each feed signal generated is provided to the respective antenna element 102.

When the antenna elements 102 receive the feed signal, they radiate it, and MIMO transmission takes place. In operation 350, the MIMO channel is communicated by an antenna cluster 103 which is established by the complex weights. When all antenna clusters 103 radiate, the whole MIMO transmission, having all MIMO channels, is transmitted.

Operation 360, feedback, depicts an embodiment wherein feedback may be given for generation of the complex weight in operation 310. The feedback may be based on far field results, for example a data connection of MIMO communications from the device 100 to another device 200. Furthermore, the device 100 may process the complex weight based on a predefined program for a different set of complex weights, or based on artificial intelligence.

Figure 13:
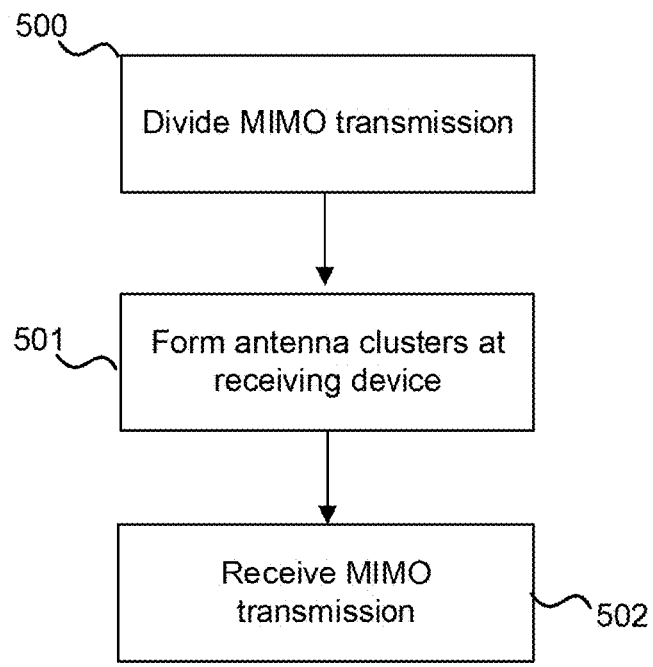
FIG. 13 illustrates a flowchart showing a method of establishing antenna clusters for MIMO reception according to an embodiment.

FIG. 13 illustrates a flowchart showing a method of establishing antenna clusters for MIMO reception according to an embodiment. The establishment of antenna clusters 103 in reception is similar to the establishment of antenna clusters 103 in transmission, and the various embodiments described above are applicable to that purpose.

In operation 500, another device 200, such as a base station, divides data to be transmitted into several MIMO streams, each of which is transmitted from one antenna cluster at the base station.

In operation 501, antenna clusters 103 are established at device 100. The device 100 forms the antenna clusters 103 similarly as in the various embodiments of transmission as described above. The antenna clusters 103 can be set up at the antenna elements of the device 100 exactly the same way as applied in the transmission. For example, this can be done at the design stage of the device 100, when the clusters 103 are predefined in the device 100. Furthermore, the device 100 may measure the couplings between antenna elements 102 while in use. In these options, all is performed in the receiving device 100 itself, and the functionalities of the other device 200 such as a base station can be ignored.

In operation 502, the device 100 receives the MIMO transmission from the base station. The MIMO transmission is received by the antennas 101 and their respective antenna clusters 103, which are established by the antenna elements 101 of the receiving device 100. If the correlation between the transmitted MIMO signals is small enough, they can be separated from the receiving end (i.e. the device 100), and finally combined with the original data. The number of antennas, the theoretical upper limit of the MIMO channels and the correlation between the antennas and the statistical properties of the channel will determine the actual data rate.

The functionality described herein can be performed, at least in part, by one or more computer program product components such as software components. According to an embodiment, the device 100 and/or another device 200 comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term "comprising" is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A device comprising:
   antennas, each of the antennas comprising antenna elements; and
   a signal processor;
   wherein the signal processor is configured to:
   receive an input signal to be communicated in a multiple-input multiple-output (MIMO) channel;
   generate complex weights based on frequency characteristics of antenna elements of the antennas;
   generate, based on the input signal and the complex weights, feed signals to feed the antennas for communicating the input signal such that the input signal is communicated in the MIMO channel through at least two antenna elements from two different antennas; and feed the antennas with the feed signals that are generated; and wherein the complex weights are generated based on electromagnetic coupling between the antenna elements of the antennas; or wherein the complex weights are generated based on electromagnetic scattering between the antenna elements of the antennas.

2. The device of claim 1, wherein the at least two antenna elements from the two different antennas form an antenna cluster corresponding to the MIMO channel for communicating the input signal.

3. The device of claim 1, wherein the signal processor is configured to receive a plurality of input signals to be communicated in a plurality of MIMO channels, to generate a plurality of feed signals to feed the antennas for communicating the plurality of input signals based on the plurality of input signals and the complex weights, and to adaptively establish antenna clusters by providing the feed signals to antenna elements of the antennas such that the plurality of input signals are communicated through the antenna clusters, wherein each antenna cluster comprises one or more antenna elements for communicating one of the plurality of input signals.

4. The device of claim 3, wherein the complex weights generated are used to establish the antenna clusters.

5. The device of claim 3, wherein the complex weights are configured so as to establish the antenna clusters from antenna elements of the antennas based on combinations of the antenna elements of the antennas.

6. The device of claim 3, wherein the antenna clusters are established based on possible combinations of antenna elements of the antennas; or wherein the antenna clusters are established based on available combinations of the antenna elements of the antennas that are determined by the signal processor.

7. The device of claim 3, wherein a first antenna cluster of the antenna clusters comprises different antenna elements than a second antenna cluster of the antenna clusters; or wherein at least one of the antenna clusters comprises different antenna elements of a same antenna.

8. The device of claim 1, wherein the signal processor is configured to generate a complex weight for each antenna element of the antennas.

9. The device of claim 1, wherein antenna elements of the antennas are adaptively clustered so that antenna elements with strong coupling are organized in a same cluster and antenna elements with low coupling are organized in different clusters.

10. The device of claim 1, wherein the complex weights are generated based on MIMO communication between the device and another device; or wherein the complex weights are generated based on electromagnetic radiation between the device and another device; or wherein the complex weights are generated based on data communicated in the MIMO channel between the device and another device.

11. The device of claim 1, wherein the feed signals for antenna elements of the antennas are configured to differ in phase and amplitude.

12. A method, comprising:
communicating by antennas, each of the antennas comprising antenna elements;

receiving an input signal to be communicated in a multiple-input multiple-output (MIMO) channel;

generating complex weights based on frequency characteristics of antenna elements of the antennas;

generating, based on the input signal and the complex weights, feed signals to feed the antennas for communicating the input signal such that the input signal is communicated in the MIMO channel through at least two antenna elements from two different antennas; and feeding the antennas with the feed signals; and wherein the complex weights are generated based on electromagnetic coupling between the antenna elements of the antennas; or wherein the complex weights are generated based on electromagnetic scattering between the antenna elements of the antennas.

13. The method of claim 12, wherein the at least two antenna elements from the two different antennas form an antenna cluster corresponding to the MIMO channel for communicating the input signal.

14. The method of claim 12, wherein the feed signals for antenna elements of the antennas are configured to differ in phase and amplitude.

15. The method of claim 12, wherein generating the complex weights comprises generating a complex weight for each antenna element of the antennas.

16. A non-transitory computer-readable media storing computer instructions, that when executed by one or more processors, cause the one or more processors to perform steps of:

communicating, by antennas, each of the antennas comprising antenna elements;

receiving an input signal to be communicated in a multiple-input multiple-output (MIMO) channel;

generating complex weights based on frequency characteristics of antenna elements of the antennas;

generating, based on the input signal and the complex weights, feed signals to feed the antennas for communicating the input signal such that the input signal is communicated in the MIMO channel through at least two antenna elements from two different antennas; and feeding the antennas with the feed signals; and wherein the complex weights are generated based on electromagnetic coupling between the antenna elements of the antennas; or wherein the complex weights are generated based on electromagnetic scattering between the antenna elements of the antennas.

17. The non-transitory computer-readable media of claim 16, wherein the at least two antenna elements from the two different antennas form an antenna cluster corresponding to the MIMO channel for communicating the input signal.

18. The non-transitory computer-readable media of claim 16, wherein the feed signals for antenna elements of the antennas are configured to differ in phase and amplitude.

* * * * *